United States Patent [19]

Ginelli

[11] Patent Number: 4,975,100
[45] Date of Patent: Dec. 4, 1990

[54] PARTICLE SEPARATOR DEVICE AND APPARATUS FOR THE PNEUMATIC CONVEYANCE OF GRANULAR MATERIALS

[75] Inventor: Ferruccio Ginelli, Cremona, Italy
[73] Assignee: Ocrim S.p.A., Cremona, Italy
[21] Appl. No.: 440,040
[22] Filed: Nov. 21, 1989
[51] Int. Cl.$^5$ .............................................. B01D 45/12
[52] U.S. Cl. .................................... 55/210; 55/459.1; 55/349; 209/144; 406/14; 406/28
[58] Field of Search ....................... 55/210, 349, 459.1, 55/411, 417, 412, 213; 209/144; 406/14, 19, 28

[56] References Cited
U.S. PATENT DOCUMENTS
4,473,326 9/1984 Oetiker .................................... 55/210

Primary Examiner—Bernard Nozick
Attorney, Agent, or Firm—Wolf, Greenfield & Sacks

[57] ABSTRACT

The present invention relates to a particle separator device which comprises a centrifugal separator with a loading duct, a duct for discharging the agglomerated particles and a duct for the discharge of the gaseous flow. The device comprises Venturi-meter throttling means, a pressure element which has a pressure containment chamber which is preferably formed with a diaphragm which supports a movable part. A pneumatic connection is provided between the chamber and the throttling means, and a mechanical coupling is provided between the movable part and valve means for adjusting the width of the passage of the gaseous flow. The device is capable of self-adjusting according to the amount of granular material which is kept in suspension. The invention furthermore relates to an apparatus for the pneumatic conveyance of granular materials which uses the device described above.

13 Claims, 3 Drawing Sheets

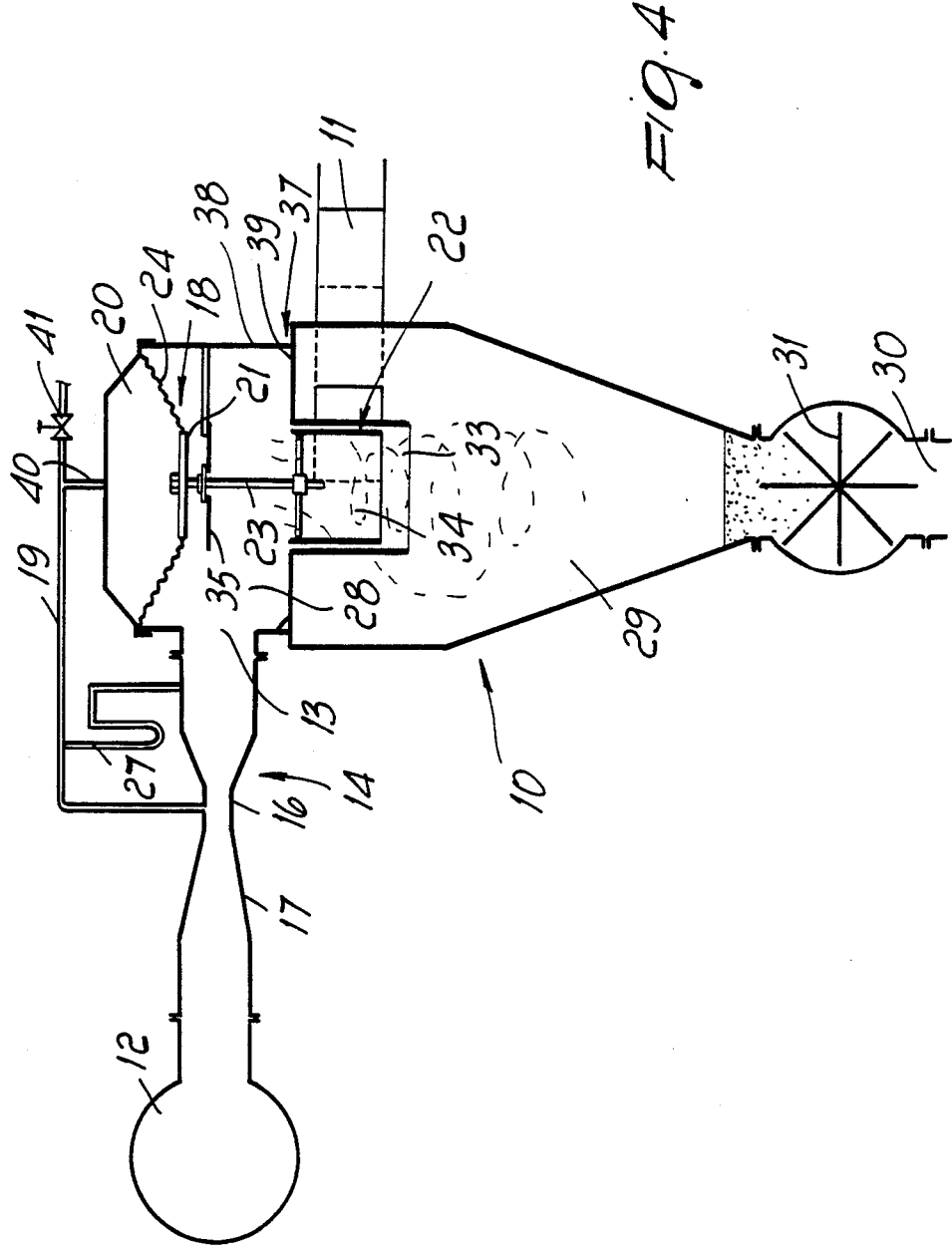

PARTICLE SEPARATOR DEVICE AND APPARATUS FOR THE PNEUMATIC CONVEYANCE OF GRANULAR MATERIALS

BACKGROUND OF THE INVENTION

1. Field of the invention

The present invention relates to a device for separating particles which are conveyed in suspension in a gaseous flow which is kept moving by a negative-pressure generator unit. More in particular, the field of the present invention relates to a centrifugal separator which has a duct for loading the particles conveyed in suspension in the gaseous flow, a duct for discharging the separated particles and a duct for discharging the separated gaseous flow. Said duct for discharging the separated gaseous flow is connected to the negative-pressure generator unit. In particular, the power which allows the movement of the gaseous flow is generated by said negative-pressure generator unit. The field of the invention furthermore comprises valve means suitable to adjust the width of the passage of the gaseous flow; the adjustment of said width allows to adjust the load losses encountered by said gaseous flow in its motion, so as to adapt the device to different operating conditions and in particular to different amounts of particles conveyed in suspension.

The invention furthermore comprises an apparatus for the pneumatic conveyance of granular materials which comprises the above described device. In particular, said apparatus comprises a plurality of lines arranged in parallel; a separator device is arranged at the top of each line, and the discharge ducts of said separator device are all connected to a single negative-pressure generator unit.

More in particular, the field of the present invention relates to a particle separator device and to an apparatus for the pneumatic conveyance of granular materials which are applied to the conveyance of particles of material generated by processes for rinding cereals.

The above is in summary the main field of industrial utilization of the invention; said field, however, does not constitute a limitation of the scope thereof, since the device and the apparatus according to the invention, in particular as described and claimed hereafter, can be advantageously employed in any other equivalent field in which operations of conveying granular material and of separating a gaseous flow from the particles contained in suspension in said flow are performed.

In general, the field of the invention relates to devices and apparata which can automatically adjust the width of the passage of the gaseous flow, so as to automatically adapt to various operating conditions, and in particular so as to adapt to operating conditions in which the amounts of suspended particles are very different. An increase in the amount of suspended particles in fact tends to decrease the flow-rate of the gaseous flow and therefore the overall efficiency of the separation. On the contrary, a decrease in the content of suspended material tends to increase the flow-rate of the gaseous flow, also to the detriment of other pneumatic lines possibly arranged in parallel.

The field of the present invention therefore relates to a separator device and to a pneumatic conveyance apparatus which are capable of self-adjusting automatically according to the different amounts of suspended particles, so as to keep the actual flow-rates of the gaseous flow as constant as possible and close to the design values.

2. Prior Art

Devices and apparata of this kind are known and are described for example by the European patent No. 0036219, wherein a pressure sensor arranged on the centrifugal separator's loading duct controls a lever system and then a pneumatic valve so as to adjust, by means of a second valve, the width of the passage of the gaseous flow.

Said known devices and apparata however, entail some problems; first of all, they require every centrifugal separator to be served by pneumatic lines for the operation of said valves. A pressure sensor is furthermore required which must be sensitive even to very modest pressure changes. In practice there is a servo-assisted diaphragm sensor equipped with lever systems, which in turn actuates another diaphragm. It is therefore a complicated and expensive system which requires difficult adjustment and continuous maintenance.

Apparata are known in which each centrifugal separator is provided with means for measuring the airspeed which are adapted to transmit the data to a computer which evaluates, in a preset sequence, the condition of each conveyor unit and adjusts valves arranged on the air intake pipe.

However, these devices, too, entail problems. Even in this case, in fact, it is necessary to provide pneumatic or electric control lines; the system itself is complicated and expensive, especially if it is applied to a limited number of conveyance units. Delicate operations are furthermore required for the installation, programming and maintenance of the system. This system would seem to be more suitable for use with extremely numerous conveyor units, when a very large number of centrifugal separators is required, but in this case, since the adjustment of each centrifugal separator is performed sequentially, computing times tend to be too long, so that the system is not flexible enough in responding to sudden variations in the amount of suspended particles, and imbalances in the flow-rates thus arise.

SUMMARY OF THE INVENTION

The aim of the invention is therefore to solve the problem of adjusting the speed of the air in pipes for the pneumatic conveyance of suspended material, obtaining a speed as constant and corresponding to the design values as possible.

An object of the invention is to be able to use standard centrifugal separators without requiring sophisticated devices.

Another object of the invention is not to use external power sources to adjust the width of the passage of the gaseous flow, so as to not require pneumatic or electric systems for each centrifugal separator.

Another object of the invention is to allow to provide detachable centrifugal separators which can be directed toward any point of a circumference arranged on the horizontal plane which traverses the axis of each centrifugal separator.

Another object of the invention is to achieve maximum simplicity and low costs for production, installation and maintenance.

A further object of the invention is to use a single diaphragm for each device.

Another object of the invention is to allow the use of standard sizes, so as to cover the entire range of centrifugal separators normally used, for any airspeed and any kind of material conveyed.

Not least object of the invention is to provide an appropriate intervention speed, neither too slow, to avoid cloggings, nor too fast, to avoid unwanted oscillations.

A further object of the invention is to exploit the circular motion of the air inside the centrifugal separator to reduce unwanted load losses.

This aim, these objects and others are achieved by a device for separating particles conveyed in suspension in a gaseous flow, according to the invention, which comprises a centrifugal separator equipped with: a duct for loading said particles conveyed in suspension in said gaseous flow; a duct for discharging said particles; a duct for discharging said gaseous flow, connected to said negative-pressure generator unit; and valve means for adjusting the width of the passage of said gaseous flow; characterized in that it comprises:

means for throttling said duct for the discharge of said gaseous flow;
  a pressure element which has a pressure containment chamber and a part which is movable according to the pressure reached by said chamber;
  a pneumatic connection between said chamber and said throttling means;
  a mechanical coupling between said movable part of said pressure element and said valve means;
  so that every increase in the speed of the gaseous flow which passes through said throttling means causes a decrease in the pressure contained in said chamber, the movement of said movable part and the proportional closure of said width for the passage of said gaseous flow; and so that each decrease in the speed of the gaseous flow through said throttling means causes, vice versa, an increase in the pressure contained in said chamber and a proportional opening of said width of the passage of said gaseous flow.

The aim and the objects are furthermore achieved by an apparatus according to the invention for conveying granular materials, characterized in that it comprises the above described device.

BRIEF DESCRIPTION OF THE DRAWINGS

Further characteristics and advantages of the invention will become apparent from the description of a preferred but non-exclusive embodiment of the device and of the apparatus, illustrated only by way of non-limitative example in the accompanying drawings, wherein:

FIG. 4 is a sectional side view of a second embodiment of the device according to the invention.

DETAILED DESCRIPTION OF THE PREFERRED EMBODIMENTS

Figure 1:
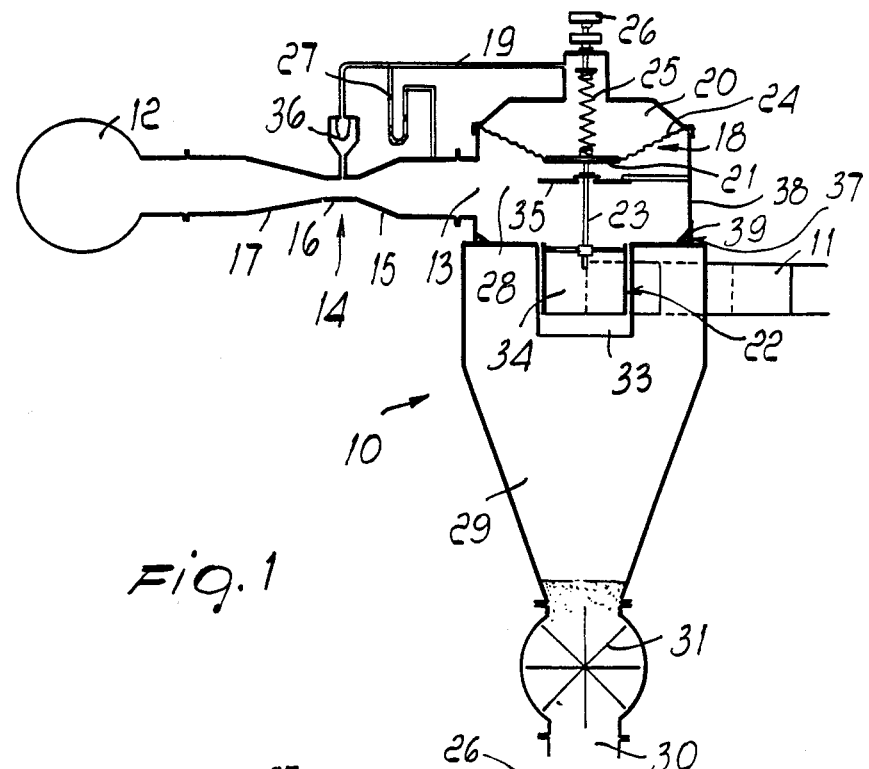
FIG. 1 is a sectional side view of the device according to the invention.
Figure 2:
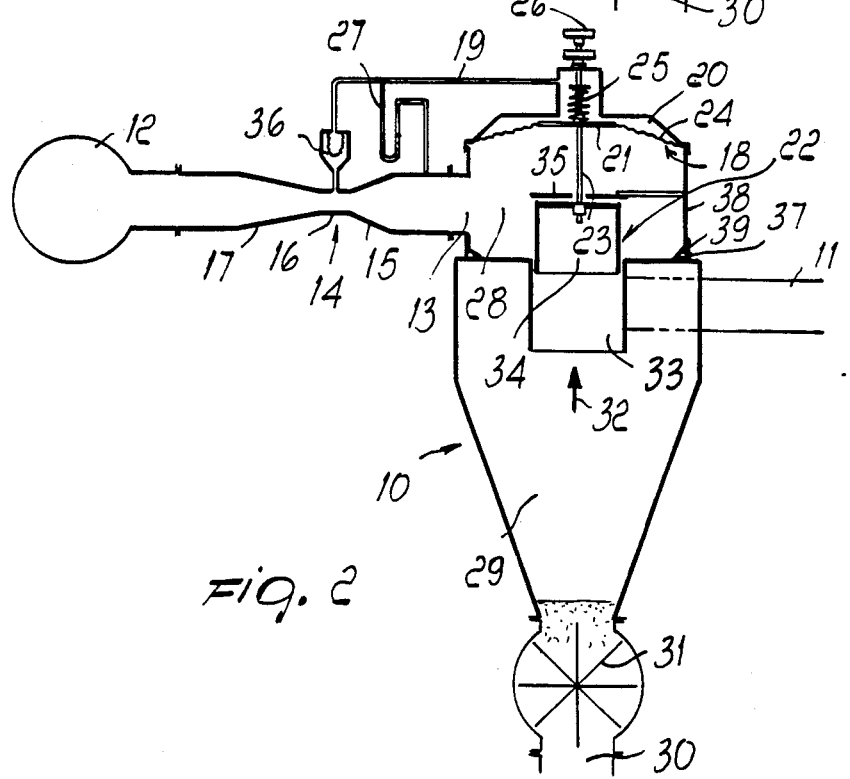
FIG. 2 is a sectional side view of the device of FIG. 1 in another operating position.
Figure 3:
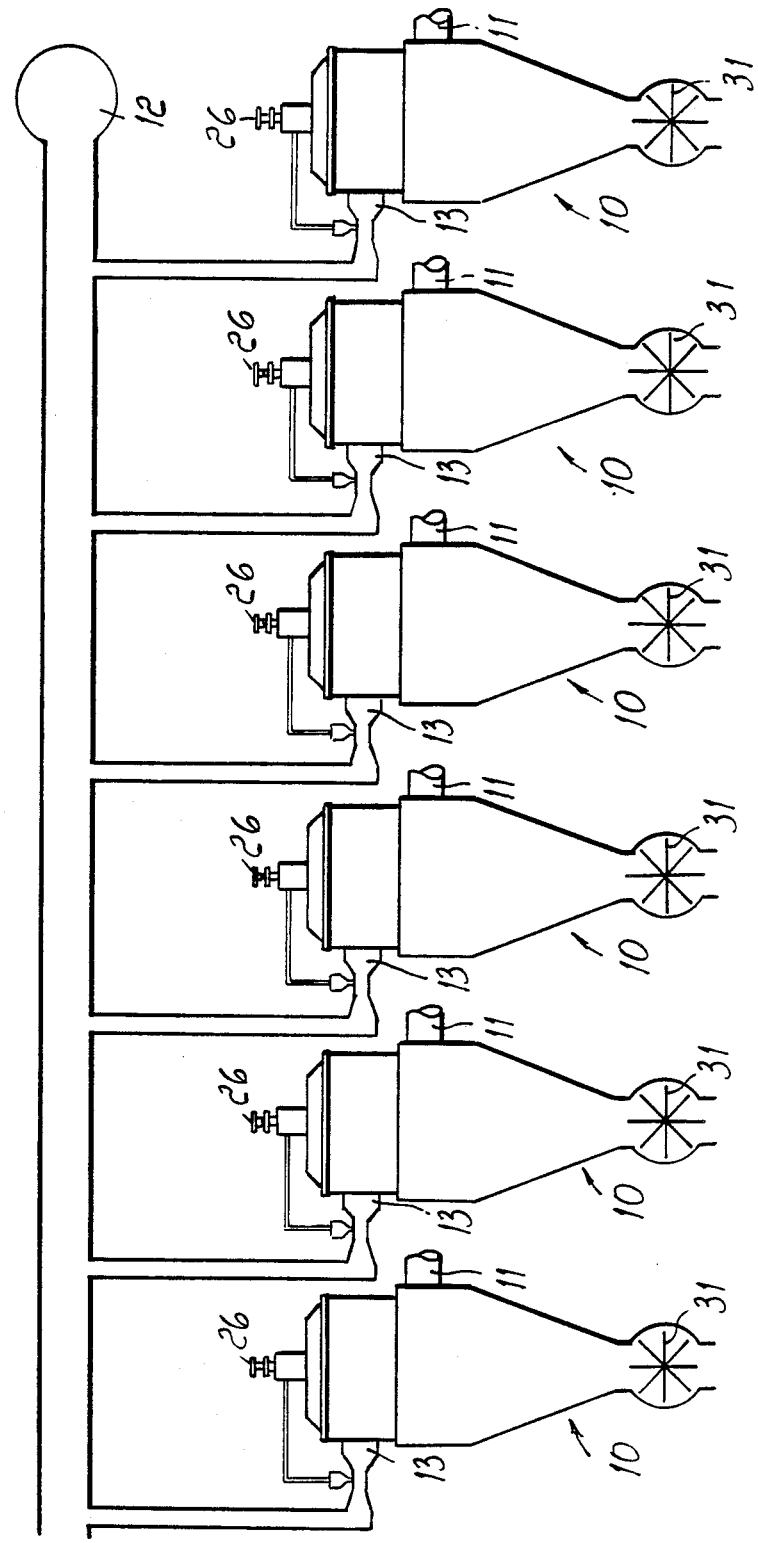
FIG. 3 is a sectional side view of the apparatus according to the invention.

With reference to FIGS. 1 to 3, the separator device 10, according to the invention, is adapted to separate particles conveyed in suspension in a gaseous flow. Said gaseous flow which contains the particles to be separated is fed to the separator device 10 by means the loading duct 11. The power for the movement of said gaseous flow is generated for example by a negative-pressure generator 12 connected to the discharge duct 13 which is connected directly to the separator device 10. The negative-pressure generator 12 is of a known kind and is not per se a part of the present invention.

Throttling means 14 are furthermore provided on the discharge duct 13 and are formed, for example, by a conical throttle 15 which is followed by a narrowed cylindrical portion 16 and by a conical expansion portion 17. A pressure element 18 is pneumatically connected, by means of the duct 19, to the throttle 14. The pressure element 18 has a pressure containment chamber 20 and a part 21 which is movable according to the pressure reached within the chamber 20.

Valve means 22 are connected to the movable part 21 by means of a coupling 22.

The pressure element 18 preferably comprises a diaphragm 24 which is made of flexible material. The movable part 23 is supported by the diaphragm 24 so that an airtight seal is provided and in particular the escape or inflow of gas into the chamber 20 is not allowed.

According to a preferred embodiment of the invention, the movable part 21 is supported by the diaphragm 24 so as to be suspended, so that the weight of the movable part 21 is supported by the diaphragm 24. This embodiment is preferred, since it allows to reduce friction and therefore allows wide and significant movements of the movable part 21 even in relation to modest increases in the pressure contained in the chamber 20. According to this preferred embodiment, the weight of the valve means 22, of the mechanical coupling 23 and of the movable part 21 may also for example be supported directly by the diaphragm 24. In this manner, the movements of the valve means 22 are also particularly friction-free and are therefore sensitive to small pressure variations.

According to an example of said preferred embodiment which has proved itself particularly useful from the constructive point of view, the movable part 21 is arranged in the central region of the diaphragm 24, which is arranged in the upper central region of the separator device 10.

Elastic means 25, formed for example by a spring, engage the movable part 21 with a force which can be adjusted, for example by means of the handwheel 26, and determines the degree of compression of the spring 25.

The movable part 21 is formed, for example, by a disk made of rigid material to which the mechanical coupling means 23, formed for example by a rod, are fixed in the central region. The duct 27, which is arranged in the shape of a siphon, indicates a manometer which is capable of measuring the difference between the pressure in the duct 19 and the pressure in the discharge duct 13.

The separator device 10 comprises a centrifugal separator which is divided into an upper region 28, from which the discharge duct 13 extends, and a lower region 29, into which the loading duct 11 enters. The centrifugal separator's actual separating action is performed substantially in the lower region 29, where the vorticose flow of the gas which contains the suspended particles performs, in a known manner, the separation of the solid part, which exits through the particle discharge duct 30 by means of the valve 31, from the gaseous flow, indicated by the arrow 32, which is sucked by the negative-pressure generator 12. A connection port 33 connects the lower region 29 with the upper region 28; the gaseous flow 32 can be sucked through said opening.

The valve means according to the invention preferably comprise a tubular body 34 which is vertically movable and engages the port 33, so that the connection between the lower region 29 and the upper region 28 occurs by means of said tubular body 34, through which the sucked gaseous flow 32 must pass. According to this preferred embodiment of the invention, an abutment body 35 is arranged above the tubular body 34 along the stroke of said tubular body 34 so as to engage the top of said tubular body, so that when said tubular body 34 moves toward the top of the vertical stroke the abutment body 35 progressively closes the upper opening of the tubular body 34, thus reducing the width of the passage of the gaseous flow 32.

The port 33 preferably comprises a fixed tubular body which is arranged outside the movable tubular body 34 and partially encloses the movable tubular body during vertical movements.

In order to prevent the dirtying or clogging of the pneumatic connection 19, a filter 36 is arranged immediately proximate to the throttle 14.

The upper region 28 and the lower region 29 are furthermore mechanically detachable and can be coupled by means of a circular gasket 37; in particular, the outer frame 38 which encloses the upper region 28 the outer frame 38 can rotate inside the guide 39, which is fixed to the frame of the lower region 29 so that the relative position of the discharge duct 13 and of the loading duct 11 can be arranged as required according to the practical requirements of assembly.

With particular reference to FIG. 4, according to a particularly preferred embodiment of the invention, the chamber 20 is connected, by means of the duct 40, to an adjustable pneumatic valve 41 which is connected to the outside to generate and adjust a flow of air through the pneumatic connection 19 toward the throttling means 14. By adjusting the valve 41 it is possible to adjust the speed of the gaseous flow 32 in the centrifugal separator with surprising precision. The flow of air entering through the valve 41 furthermore keeps the duct 19 clean and makes the filter 36 redundant.

The device according to the invention can preferably be used as particle separator when said particles are constituted by material generated by processes for grinding cereals.

The invention furthermore comprises an apparatus for the pneumatic conveyance of granular materials and for then separating said materials from the conveying gaseous flow. Said apparatus comprises a plurality of lines 11 arranged in parallel; a separator device 10 according to the invention is arranged at the top of each of said lines. The discharge ducts 13 for the gaseous flow of said separators 10 are preferably all connected to a single negative-pressure generator unit 12. Each of said separator devices 10 is configured according to the above description.

The operation is as follows: assuming that the device is arranged in the position illustrated in figure 1 when observations begin, the valve means 22, and in the particular the tubular body 34, are in the lower position of their vertical movement, and therefore the upper opening of the tubular body 34 is completely open and the gaseous flow 32 can move freely from the lower region 29 to the upper region 28. If a decrease in the load losses encountered by the gaseous flow along the loading duct 11 occurs at this point for any reason, for example due to a decrease in the content of suspended particles, the speed of the gaseous flow 32 increases, since the suction power of the negative-pressure generator unit is constant; said flow thus reaches a speed which is higher than the centrifugal separator's design values. This speed increase produces a greater speed increase inside the throttle 14. This produces a negative pressure inside the throttle 14 which is transmitted to the pneumatic connection 19 and then to the chamber 20. The negative pressure of the chamber 20 causes the diaphragm 24 and the movable part 21 to rise. The movable part 21 thus pulls the mechanical coupling 23 and the movable tubular body 34 upward. At this point the condition illustrated in figure 2 is reached. The upward movement of the tubular body 34, which arranges itself proximate to the abutment body 35, progressively closes the upper opening of the tubular body 34, so that the gaseous flow 32 undergoes load losses at the valve means 22, and the speed of the gaseous flow 32 is consequently returned to the design values.

Vice versa, if an increase in the load losses inside the loading duct 11 occurs at this point, for example due to an increase in the suspended particles, the speed of the gaseous flow 32 is lower than the design values, thus giving rise to a lower efficiency of the centrifugal separator. Said lower speed of the gaseous flow 32 also produces a speed decrease inside the throttle 14, so as to provide an increase in pressure inside said throttle and therefore a corresponding increase in pressure in the pneumatic coupling 19 and in the chamber 20. The diaphragm 24 consequently lowers, the movable part 21 moves downward together with the mechanical coupling 23 and the movable tubular body 34. The upper opening of the movable tubular body 34 is thus widened, since the distance from the abutment body 35 is increased, and this produces a decrease in the load losses inside the valve means 22, so that the speed of the gaseous flow 32 increases until it reaches the design values.

The setting of the correct design values for each device can be determined simply by adjusting the handwheel 26 and therefore adjusting the pressure of the spring 25 for a given power of the negative-pressure generator unit 12.

In practice it has been observed that the device according to the invention achieves all the intended aims and objects; in particular, when said device is used in an apparatus which uses several lines in parallel, the operation of each device 10 does not interfere with the operation of the other lines, since each line is able to keep the load losses constant according to the design values.

It has been furthermore verified that the particular configuration of the discharge duct 13, arranged laterally, leads to particularly modest load losses, so that the overall efficiency of the device is particularly satisfactory.

The invention is susceptible to numerous modifications and variations; thus, for example, the spring 25 may be eliminated completely, in which case the function of the spring 25 may be performed by the weight of the movable part 21, which may be weighted appropriately. In this case the handwheel 26 would merely be used to provide an upper limit for the stroke of the movable part 21.

Where technical features mentioned in any claim are followed by reference signs, those reference signs have been included for the sole purpose of increasing the intelligibility of the claims and accordingly such refer-

I claim:

1. Device for separating particles conveyed in suspension in a gaseous flow kept in motion by a negative-pressure generator, comprising a centrifugal separator equipped with: a duct for the discharge of said particles conveyed in suspension in said gaseous flow, a duct for discharging said particles, a duct for discharging said gaseous flow, connected to said negative-pressure generator unit; and valve means for adjusting the width of the passage of said gaseous flow;

characterized in that it comprises:
means for throttling said duct for the discharge of said gaseous flow;
a pressure element which has a pressure containment chamber and a part which is movable according to the pressure reached in said chamber;
a pneumatic connection between said chamber and said throttling means;
a mechanical coupling between said movable part of said pressure element and said valve means;
so that every increase in the speed of the gaseous flow which moves through said throttling means causes a decrease in the pressure contained in said chamber, the movement of said movable part and the proportional closure of said passage width of said gaseous flow; and so that every decrease in the speed of the gaseous flow through said throttling means causes, vice versa, an increase in the pressure contained in said chamber and a proportional opening of said passage width of said gaseous flow.

2. Device according to claim 1, characterized in that it comprises elastic means which engage said movable part, the force exerted by said elastic means on said movable part being adjustable.

3. Device according to claim 1, characterized in that said containment chamber is formed by the upper part of said centrifugal separator, said upper part being detachable for the maintenance of said pressure element.

4. Device according to claim 1, characterized in that said chamber is connected to an adjustable pneumatic valve connected to the outside to allow to generate and adjust a flow of air through said pneumatic connection toward said throttling means.

5. Device according to claim 1, characterized in that said pressure element comprises a diaphragm.

6. Device according to claim 5, characterized in that said movable part is arranged in the central region of said diaphragm.

7. Device according to claim 5, characterized in that said movable part is supported by said diaphragm.

8. Device according to claim 7, characterized in that said movable part is supported by said diaphragm so as to be sUspended, so that the weight of said movable part is supported by said diaphragm.

9. Device according to claim 8, characterized in that the weight of said valve means, of said mechanical coupling and of said movable part is supported directly by said diaphragm.

10. Device according to claim 1, characterized in that said centrifugal separator comprises an upper region, from which said duct for the discharge of said gaseous flow extends, a lower region, into which said loading duct enters, and an opening for connecting said lower region and said upper region, said valve means comprising a tubular body which is vertically movable, engages said opening and connects said lower region with said upper region.

11. Device according to claim 10, characterized in that is comprises an abutment body arranged above said tubular body, along the stroke of said tubular body, so that when said tubular body moves toward the top of said stroke said abutment body progressively closes the upper opening of said tubular body, thus reducing the passage width of said gaseous flow.

12. Apparatus for the pneumatic conveyance of granular materials and for then separating said materials from the conveying gaseous flow, said apparatus including at least one device for separating particles conveyed in suspension in a gaseous flow depth in motion by a negative-pressure generator, comprising a centrifugal separator equipped with: a duct for the discharge of said particles conveyed in suspension in said gaseous flow, a duct for discharging said particles, a duct for discharging said gaseous flow, connected to said negative-pressure generator unit; and valve means for adjusting the width of the passage of said gaseous flow;

characterized in that it comprises:
means for throttling said duct for the discharge of said gaseous flow;
a pressure element which has a pressure containment chamber and apart which is movable according to the pressure reached in said chamber;
a pneumatic connection between said chamber and said throttling means;
a mechanical coupling between said movable part of said pressure element and said valve means;
so that every increase in the speed of the gaseous flow which moves through said throttling means causes a decrease in the pressure contained in said chamber, the movement of said movable part and the proportional closure of said passage width of said gaseous flow; and so that every decrease in the speed of the gaseous flow through said throttling means causes, vice versa, an increase in the pressure contained in said chamber and a proportional opening of said passage width of said gaseous flow.

13. Apparatus according to claim 12 including a plurality of devices for separating particles and a plurality of lines arranged in parallel for the pneumatic conveyance of granular materials to each device, the respective ducts for the discharge of the gaseous flow of each device being connected to a single negative-pressure generator unit.

* * * * *